United States Patent [19]

Kanayama et al.

[11] Patent Number: 4,536,672
[45] Date of Patent: Aug. 20, 1985

[54] FLAT TYPE ROTARY ELECTRIC MACHINE

[75] Inventors: Kenji Kanayama, Kariya; Shuzo Kinkori, Okazaki, both of Japan

[73] Assignee: Nippondenso Co., Ltd., Kariya, Japan

[21] Appl. No.: 637,881

[22] Filed: Aug. 6, 1984

[30] Foreign Application Priority Data

Aug. 12, 1983 [JP] Japan .................................. 58-159940
Aug. 31, 1983 [JP] Japan .................................. 58-159940

[51] Int. Cl.³ ............................................... H02K 1/22
[52] U.S. Cl. ....................................... 310/268; 310/62; 310/63; 310/156; 310/184; 310/DIG. 6
[58] Field of Search ............... 310/268, 114, 156, 180, 310/184, 207, 208, 62, 63, 89, 257, 40 MM

[56] References Cited

U.S. PATENT DOCUMENTS

| | | | |
|---|---|---|---|
| 3,231,774 | 1/1966 | Henry-Baudot | 310/268 |
| 3,500,095 | 3/1970 | Keogh | 310/268 |
| 3,999,092 | 12/1976 | Whiteley | 310/114 |
| 4,451,749 | 5/1984 | Kanayama et al. | 310/62 |
| 4,484,097 | 11/1984 | Kanayama et al. | 310/268 |
| 4,500,806 | 2/1985 | Kanayama et al. | 310/207 |

FOREIGN PATENT DOCUMENTS

| | | | |
|---|---|---|---|
| 0096415 | 12/1983 | European Pat. Off. | 310/268 |
| 1193587 | 5/1965 | Fed. Rep. of Germany | 310/268 |
| 1234263 | 10/1960 | France | 310/268 |

*Primary Examiner*—R. Skudy
*Attorney, Agent, or Firm*—Cushman, Darby & Cushman

[57] ABSTRACT

A flat type rotary electric machine has a flat stator armature coil and two rotors having magnets disposed in opposite relationship to the coil. The flat coil is formed by an annular carrier member of an insulating material and windings carried thereby. The windings are formed by a plurality of layers of annular rows of generally radially extending and axially thin conductor segments each having radially inner and outer end sections and an intermediate effective section axially aligned with magnets on an associated rotor during rotation thereof. The axial thickness of the effective section of each of the conductor segments of the outermost layers is smaller than the axial thickness of the effective section of each of the conductor segments of inner layers.

4 Claims, 5 Drawing Figures

FLAT TYPE ROTARY ELECTRIC MACHINE

BACKGROUND OF THE INVENTION

1. Field of the Invention

The present invention relates to an axial air gap type rotary electric machine such as printed circuit motor, multi-phase alternator and flat motor. More particularly, the invention is concerned with an improvement in a cooling mechanism of the rotay electric machine of the class specified above.

2. Description of the Prior Art

The rotary electric machine of the class specified above is provided with a flat coil comprising an annular carrier member of an electrically insulating material and windings carried by the carrier member. The windings are formed by a plurality of annular rows of generally radially extending and axially thin conductors each having radially inner and outer end sections and an intermediate section. The flat coil is disposed in the axial air gap type rotary electric machine such that the opposite sides or end faces of the flat coil are faced towards magnets. More specifically, in the case of an axial air gap type generator, the flat coil is employed as a stator coil and has opposite end faces disposed in opposite relationship to magnets carried by a pair of rotors mounted on a shaft for rotation therewith so that, when the rotors are rotated with the shaft, the flat coil cooperates with the magnets to generate induced electromotive force. Further specifically, only the intermediate sections of the conductors of the flat coil are faced toward the magnets of the rotors and effective to produce the electromotive force. Thus, the intermediate section of each conductor of the flat coil is termed herein as an "effective section".

The windings of the flat coils of the prior art axial air gap type rotary electric machines were formed either by wires each having a round cross section of a uniform diameter throughout its length, as seen in flat motors, or by conductor segments each having a uniform axial thickness, as seen in printed circuit motors. Because of the structure of the flat coil of this kind of rotary electric machines, the flat coil had a problem that the radially and axially inner parts of the flat coil could not easily be cooled and thus suffered from a high or elevated temperature. In addition, because modern printed circuit motors, flat motors and alternators are designed to have reduced sizes and to produce increased outputs, the heat produced in the entireties of the flat coils used in these rotary electric machines tend to increase compared with the heat produced in the relatively large-sized prior art rotary electric machines. Thus, it is now required to prevent the temperature rise in the flat coils of the axial air gap type rotary electric machines.

U.S. Pat. No. 3,231,774 discloses a three-phase armature coil formed by an annular disc or carrier member and three-phase windings caried by the carrier member. In making a generator or motor of a large capacity by such a three-phase armature coil as dislcosed in the U.S. patent referred to, a plurality of such annular carrier members are stacked to form a laminated structure and the windings are connected in parallel relationship to each other to increase the output.

U.S. Pat. No. 3,500,095 discloses a laminated structure of a flat DC motor armature coil which is adapted to be supplied with a DC current from a brush unit.

In a rotary electric machine having such a laminated or multi-layered structure of flat coil, temperature rise is caused particularly in the axially inner parts of the annular effective zone of the flat coil. In an attempt to solve this problem, if the cross-sections of the generally radial conductor segments of the flat coil are increased to decrease the density of the current passing therethrough, the axial distance between the magnets disposed on the opposite sides of the flat coil is undesirably increased to increase the magnetic reluctance of the path of the magnetic flux produced by the magnets, with a resultant disadvantageous problem that the efficiency of the rotary electric machine is lowered.

SUMMARY OF THE INVENTION

The present invention has an object to provide an improved flat type rotary electric machine in which the problems discussed above are solved.

The flat type rotary electric machine according to the present invention includes a generally annular and flat stator armature coil defining therein a central opening, a shaft rotatably extending through the central opening, and a pair of rotors mounted on the shaft for rotation therewith and disposed on the opposie sides of the armature coil. The rotors have permanent magnet means disposed in opposite relationship to the annular faces of the armature coil. The armature coil comprises an annular carrier member of an electrically insulating material and windings carried by the carrier member. The windings are formed by a plurality of layers of annular rows of generally radially extending and axially thin conductors each having radially inner and outer end sections and an intermediate effective section. The axial thickness of at least the effective section of each of the conductors of the outermost layers is smaller than the axial thickness of the effective section of each of the conductors of inner layers.

This feature of the invention advantageously assures an improved heat radiation and thus cooling of the armature coil because the production in the heat in the armature coil during operation thereof is concentrated in the thinner effective section of each of the conductors of the outermost layers and cooling air flows in direct contact with the thinner effective sections of the conductors of the outermost layers. In addition, the feature that the effective sections of the conductors of the outermost layers rather than of the inner layers are thinner advantageously assures that the axial air gap of the rotary electric machine can be reduced with a resultant increase in the amount of the magnetic flux passing through the air gap, whereby the output of the rotary electric machine can be increased without any increase in the size thereof. Furthermore, because the conductors of only the outermost layers of the flat coil are provided with the thinner effective sections, the flat coil can be manufactured without difficulty.

The above and other objects, features and advantages of the present invention will be made more apparent by the following description with reference to the accompanying drawings.

DESCRIPTION OF A PREFERRED EMBODIMENT

Figure 1:
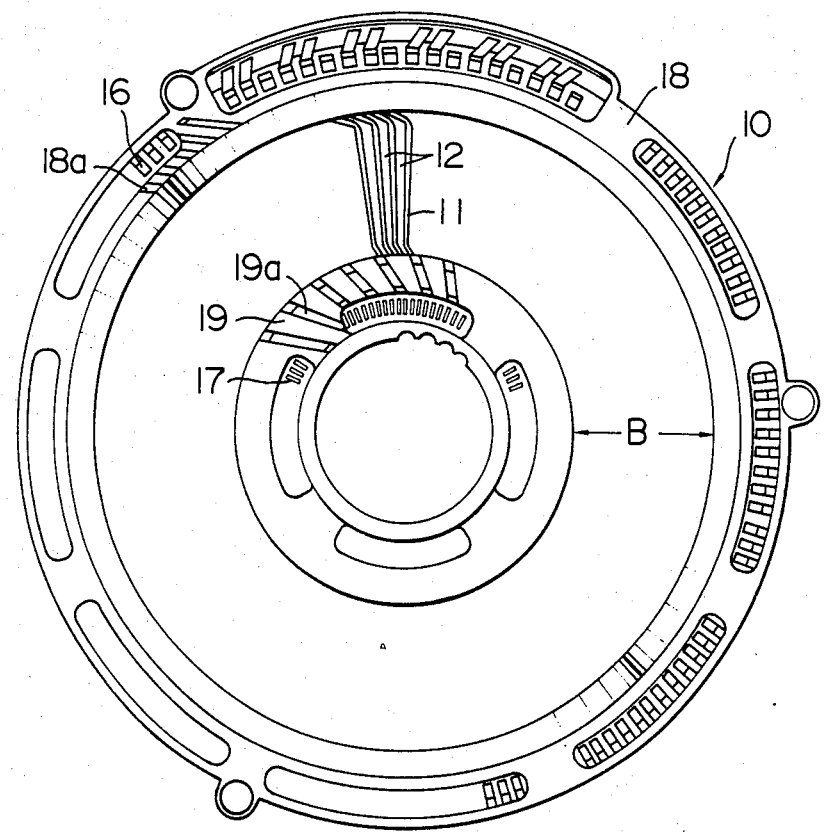
FIG. 1 is a front view of a flat coil of a flat alternator embodying the present invention.

Refering first to FIG. 1, a flat coil 10, which is an annular stator armature, includes annular rows of a large number of radial conductor segments 12 secured to and carried by a supporting disc or annular carrier member 11 of an electrically insulating material. Each of the conductor segments 12 has an effective section disposed within an annular zone of the flat coil designated by B and end sections disposed radially inwardly and outwardly of the effective section. The radially inner and outer end sections have end extremities bent to extend axially of the flat coil to form radially outer and inner coil fins 16 and 17, as will be described in more detail later. The flat coil 10 further includes radially outer and inner annular holders 18 and 19 secured to the radially outer and inner peripheral edges of the annular carrier member 11 and provided with holder fins 18a and 19a each projecting axially outwardly of the carrier member 11, as will be described in more detail later. The inner holder 19 defines therein a central opening for a shaft of an axial air gap type rotary electric machine which is equipped with the flat coil 10. The coil fins 16 and 17 have been described as being provided on all of the conductor segments 12, but it will be apparent to those in the art that only some of or a selected number of the conductor segments may be provided with such coil fins provided that the coil fins are disposed at equal circumferential intervals.

The conductor segments 12 are arranged not solely on the outer surfaces (end faces) of the annular carrier member 11; namely, the segments 12 are arranged in a plurality of layers, as will be described hereunder.

Figure 2:
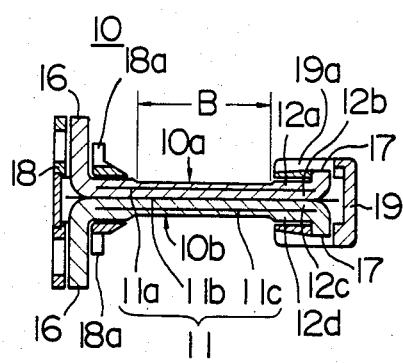
FIG. 2 is an axial section of a half of the flat coil shown in FIG. 1.

FIG. 2 is an axial sectional view of a half of the flat coil shown in FIG. 1. Strictly speaking, however, FIG. 2 is not a section taken on a single plane but is a composite sectional view showing all the layers of the conductor segments which, in fact, are angularly and circumferentially offset from each other.

As will be seen in FIG. 2, the flat coil 10 includes four layers of conductor segments 12a, 12b, 12c and 12d and three insulating layers 11a, 11b and 11c which form the annular carrier member 11 and are sandwiched between the layers of the conductor segments, respectively. Two layers of conductor segments 12a and 12b and the insulating layer 11a form a module 10a, while the other two layers of conductor segments 12c and 12d and the insulating layer 11c form another module 10b. The two modules 10a and 10b are stacked together with the third insulating layer 11b interposed therebetween to form the laminated structure shown in FIG. 2. The conductor segments 12a and 12d will be called "conductor segments of the outermost layers", whereas the conductors 12b and 12c will be termed "conductor segments of the inner layers".

The annular rows of layers of the conductor segments can be fabricated by employing any one of the pressing, electroforming and electrolytic techniques disclosed in U.S. patent application Ser. No. 501,760 filed June 6, 1983 by Kanayama et al, now U.S. Pat. No. 4,484,097, and also in the corresponding E.P.C. Publication No. 96,415 of European patent application No. 83105587.6 filed June 7, 1983 in the name of NIPPONDENSO CO., LTD. The disclosure in the earlier U.S. application referred to is incorporated herein by reference. Alternatively, the conductor segments can be made by die-casting technique.

The conductor segments 12a and 12b are disposed on the opposite faces of the insulating layer 11a and arranged in the pattern shown in FIG. 1. Similarly, the other conductor segments 12c and 12d are disposed and arranged on the opposite faces of the insulating layer 11c. In each of the modules 10a and 10b, the radially inner and outer ends of the conductor segments 12a or 12d on a first face of the insulating layer 11a or 11c are respectively electrically connected by welding or brazing to the radially inner and outer ends of the conductor segments 12b or 12c on the second face of the insulating layer 11a or 11c so that the electrically connected conductor segments on the opposite faces of the insulating layer 11a or 11c from at least one winding (three windings in the case of a three-phase rotary electric machine). The radially outer and inner end extremities of the connected ends of the conductor segments are bent to extend axially of the flat coil 10 to form the aforementioned coil fins 16 and 17, as best seen in FIG. 2. The coil fins 16 and 17 advantageously increase the heat radiation surface areas of the flat coil 10.

The radially outer and inner annular holders 18 and 19, which have been mentioned previously, are operative to bind the radially outer and inner peripheral edges of the two modules 10a and 10b and the intermediate insulating layer 11b so that they are united together to form the flat coil 10. The holder fins 18a and 19a, which have also been mentioned previously, are effective to increase the heat radiation surface areas of the flat coil 10.

Figure 3:
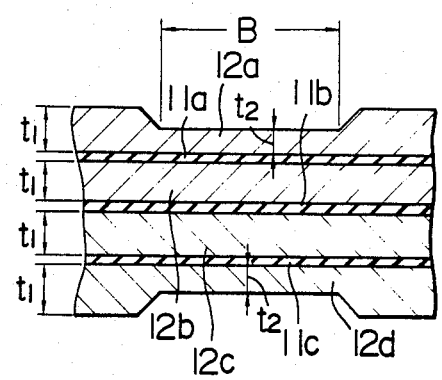
FIG. 3 is an enlarged fragmentary sectional view of the flat coil showing the details of the laminated or multi-layered structure thereof.

Referring to FIG. 3, the conductor segments 12b and 12c of the inner layers have thicknesses $t_1$ (measured axially of the flat coil 10) which are substantially uniform throughout the radial lengths of the conductor segments 12b and 12c, whereas the conductor segments 12a and 12d of the outermost layers do not have uniform thicknesses throughout their radial lengths. More specifically, although the radially outer and inner end sections of the conductor segments 12a and 12d of the outermost layers have thicknesses substantially equal to the thicknesses $t_1$ of the conductor segments of the inner layers, the effective sections B of the conductor segments 12a and 12d have thicknesses $t_2$ less than the thicknesses $t_1$.

Figure 4:
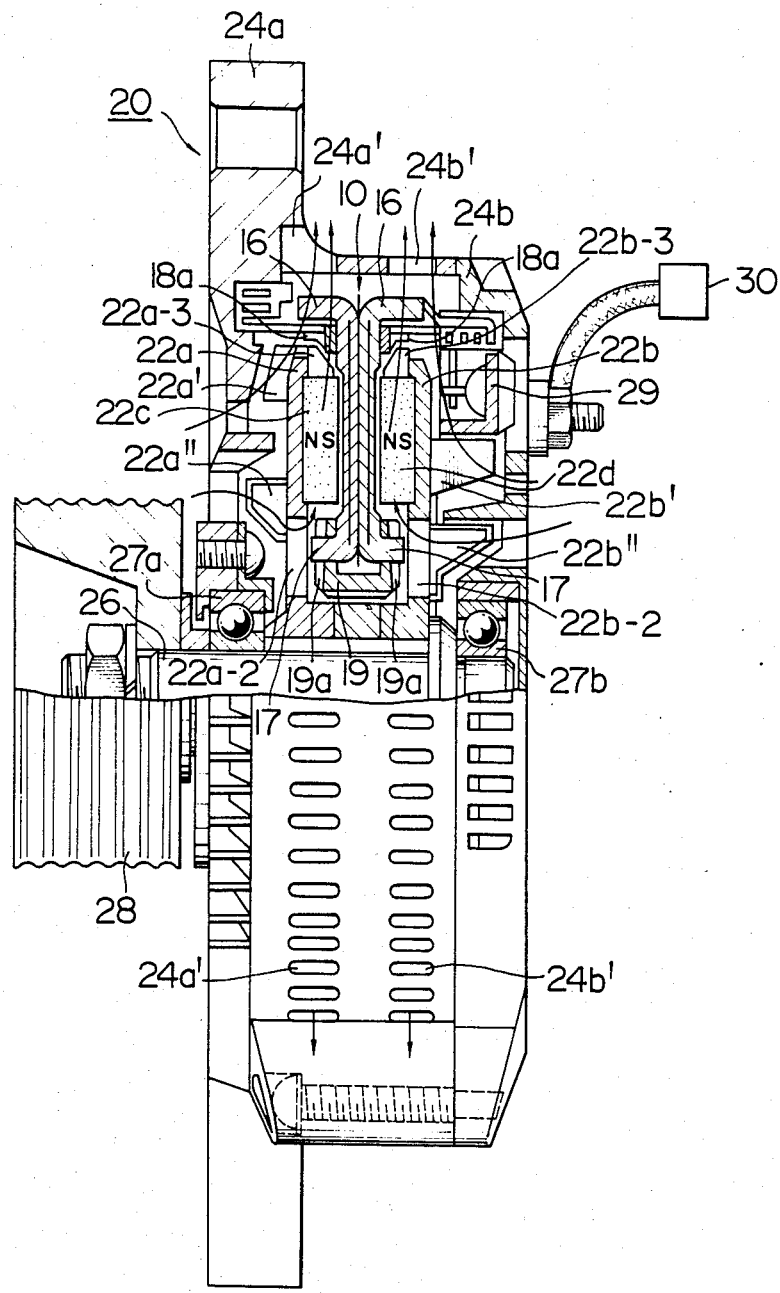
FIG. 4 is a partly axial sectional and partly side elevational view of the flat alternator embodying the present invention.

FIG. 4 shows a flat type alternator 20 in which the flat annular stator armature coil 10 described above is employed. The flat coil 10 is disposed in the housing and held at its outer periphery between housing parts 24a and 24b. A pair of rotors 22a and 22b are disposed on the opposite sides of the flat coil 10 and secured by a key member to a shaft 26 which rotatably extends through the central opening in the flat coil 10 and is rotatably supported by a pair of bearings 27a and 27b mounted on the housing parts 24a and 24b, respectively. A pulley 28 is mounted on the shaft 26 for rotation therewith.

Figure 5:
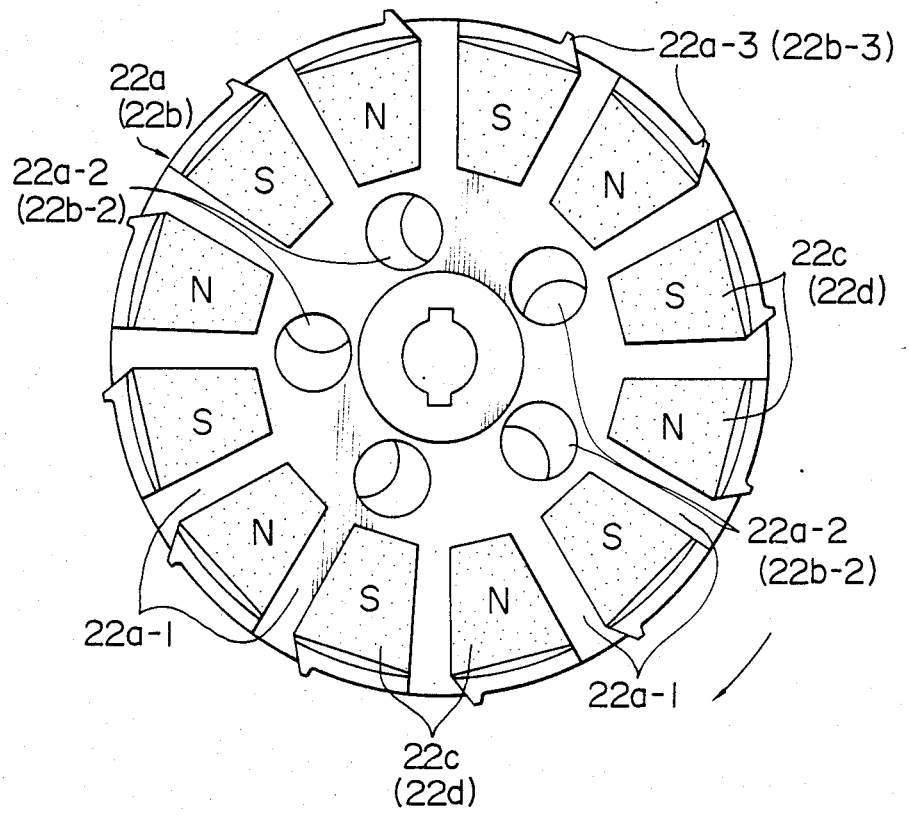
FIG. 5 is a front view of one of rotors of the alternator shown in FIG. 4.

The rotors 22a and 22b are of similar structures and thus it will be sufficient to describe the structure of one of the two rotors with reference to FIG. 5. Magnet segments 22c or 22d having different polarities are secured to the face of the rotor 22a or 22b directed to the flat coil 10 and are arranged alternately on a circle about the axis of the rotor and adjacent to the outer periphery thereof. The magnet segments 22c or 22d are circumferentially spaced one from another to define radial grooves 22a-1. The rotor is formed therein with axial through-holes or openings 22a-2 or 22b-2 arranged on a circle disposed between the annular row of the magnet segments 22c or 22d and the central shaft hole in the rotor. Radially outwardly projecting fan blades 22a-3 or 22b-3 are provided along the outer periphery of the rotor and disposed adjacent to the radially outer ends of the radial grooves 22a-1, respectively.

Referring again to FIG. 4, annular rows of fan blades 22a' and 22a" are secured to the axially outer face of the rotor 22a. Similarly, the rotor 22b is provided with annular rows of fan blades 22b' and 22b" secured to the axially outer face of the rotor 22b. The annular row of the fan blades 22a' is disposed adjacent to the outer periphery of the rotor 22a, while the annular rows of the fan blades 22a" and 22b" are disposed adjacent to the openings 22a-2 and 22b-2 formed in the rotors. The annular row of the fan blades 22b' on the rotor 22b is disposed radially inwardly of a thyristor regulator 29 disposed inside the housing part 24b.

The rotors 22a and 22b and the flat coil 10 are dimensioned such that the radially outer coil fins 16 and the radially outer holder fins 18a are disposed substantially radially outwardly of the fan blades 22a-3 and 22b-3, while the radially inner coil fins 17 and the radially inner holder fins 19a are disposed adjacent to the axial openings 22a-2 and 22b-2 formed in the rotors 22a and 22b. The annular row of the magnet segments 22c or 22d on each of the rotors 22a and 22b has a radial dimension slightly less than the radial dimension of the effective section B of each of the conductor segments 12a or 12d of each of the outermost layers of the flat coil 10 and is so disposed as to be axially aligned with the effective sections of the conductor segments, as will be seen in FIG. 4. Thus, the spacing between the pair of rotors 22a and 22b can be smaller than in the case where the effective sections of the conductor segments of the outermost layers are as thicker as the effective sections of the conductor segments of the inner layers.

The housing of the alternator has end walls formed therein with axial openings disposed adjacent to the rows of fan blades 22a', 22a", 22b' and 22b", as will be clearly seen in FIG. 4. The peripheral wall of the alternator housing is formed therein with rows of air discharge openings 24a' and 24b' disposed substantially radially outwardly of the radially outer coil fins 16, as will be also clearly seen in FIG. 4.

In operation, when the rotors 22a and 22b are rotated by a driving means (not shown) through the pulley 28 and the shaft 26, an induced electromotive force is produced in the stator armature coil 10 and is rectified by the thyristor regulator 29 into a DC current which is outputted through an output terminal 30. Due to the rotation of the rotors 22a and 22b, the fan blades 22a', 22a", 22b' and 22b" on the axially outer faces of the rotors operate to induce flows of air which pass through the axial openings in the alternator housing end walls into the housing and go out of the housing through the air discharge openings 24a' and 24b' formed in the peripheral wall thereof. The air flows are represented by thick arrows in FIG. 4. More specifically, the fan blades 22a' act as centrifugal fan blades and are operative to produce generally radially outward air flows which cool the axially outer ends of the left-hand coil fins 16 and are discharged through the air discharge openings 24a', as shown in FIG. 4. The fan blades 22b' on the rotor 22b also act as centrifugal fan blades and produce generally radially outward air flows which cool the thyristor regulator 29 and the axially outer ends of the right-hand coil fins 16 and are then discharged through the air discharge openings 24b'. The fan blades 22a" and 22b" act as axial fan blades and are operative to produce generally axial air flows which pass through the openings 22a-2 and 22b-2 in the rotors 22a and 22b, respectively, to cool the radially inner coil fins 17 and the radially inner holder fins 19a on the opposite faces of the flat coil 10. The radial grooves 22a-1 (see FIG. 5) formed between the magnet segments and the fan blades 22a-3 and 22b-3 along the radially outer peripheral edges of the rotors 22a and 22b are operative to centrifugally induce the air and thus to radially outwardly turn the axial air flows caused by the fan blades 22a" and 22b". Thus, the radially outwardly turned streams of air pass through the gaps between the opposite faces of the flat coil 10 and the axially inner faces of the rotors 22a and 22b. In other words, the air flows radially outwardly in direct contact with the thinner effective sections of the conductor segments 12a and 12d of the outermost layers of the flat coil 10. It will be appreciated that more heat is produced in the thinner effective sections of the conductor segments 12a and 12d of the outermost layers than in the effective sections of the conductor segments of the inner layers. This feature assures an improved cooling of the multi-layered structure of the flat coil. This improvement cannot be attained by simply reducing the thicknesses of conductor segments of all of the layers, in which case the reduction in thickness of the inner layer conductor segments will adversely increase their resistances to current and thus raise the heat. The radial air flows which have cooled the effective sections of the outermost layer conductor segments then flow in contact with the radially outer holder fins 18a and the radially outer coil fins 16 on the opposite faces of the flat coil 10 and are then discharged through the air discharge openings 24a' and 24b'.

The flat coil 10 has been described and shown as having four layers of conductor segments. However, it will be apparent to those in the art that the conductor segments may be disposed in an increased number of layers.

What is claimed is:
1. A flat type rotary electric machine including:
a generally annular and flat stator armature coil defining therein a central opening;
a shaft rotatably extending through said central opening; and
a pair of rotors mounted on said shaft for rotation therewith and disposed on the opposite sides of said armature coil;
said rotors having permanent magnet means disposed in opposite relationship to the annular faces of said armature coil;
said armature coil comprising:
an annular carrier member of an electrically insulating material and windings carried by said carrier member;
said windings being formed by a plurality of layers of annular rows of generally radially extending and axially thin conductors each having radially inner and outer end sections and an intermediate effective section;
the axial thickness of at least the effective section of each of the conductors of the outermost layers being smaller than the axial thickness of the effec- tive section of each of the conductors of inner layers.

2. A flat type rotary electric machine according to claim 1, wherein the permanent magnet means on each rotor has a radial dimension not greater than the radial dimension of the effective section of each conductor of the outermost layer associated with the rotor and is so disposed as to be axially aligned with the effective sections of successive conductors of said associated outermost layer.

3. A flat type rotary electric machine according to claim 2, wherein the permanent magnet means on each rotor comprises a plurality of magnet segments circumferentially spaced from each other to define a plurality of substantially radial grooves and wherein each rotor is provided with centrifugal fan blades disposed adjacent to the outer peripheral edge of said rotor, whereby when the rotor is rotated, the centrifugal fan blades cooperate with said radial grooves to cause substantially radially outward cooling air flows between the rotor and said armature coil.

4. A flat type rotary electric machine according to claim 3, wherein the radially outer end sections of at least some of the conductors of the outermost layers are bent to form axially extending fins disposed in the paths of said radially outward cooling air flows.

* * * * *

UNITED STATES PATENT AND TRADEMARK OFFICE
CERTIFICATE OF CORRECTION

PATENT NO. : 4,536,672
DATED : August 20, 1985
INVENTOR(S) : KANAYAMA et al

It is certified that error appears in the above-identified patent and that said Letters Patent is hereby corrected as shown below:

On The Title Page

Priority Data, line 1, is incorrect. Should read:

--Aug. 12, 1983 [JP] Japan 58-147341--

Signed and Sealed this

Eighth Day of July 1986

[SEAL]

Attest:

DONALD J. QUIGG

Attesting Officer      Commissioner of Patents and Trademarks